United States Patent
Narby et al.

(10) Patent No.: US 11,138,445 B2
(45) Date of Patent: Oct. 5, 2021

(54) VISION SYSTEM AND METHOD FOR A MOTOR VEHICLE

(71) Applicant: VEONEER SWEDEN AB, Vargarda (SE)

(72) Inventors: Erik Narby, Linköping (SE); Martin Nilsson, Linköping (SE)

(73) Assignee: VEONEER SWEDEN AB, Vargarda (SE)

( * ) Notice: Subject to any disclaimer, the term of this patent is extended or adjusted under 35 U.S.C. 154(b) by 457 days.

(21) Appl. No.: 16/328,583

(22) PCT Filed: Aug. 30, 2017

(86) PCT No.: PCT/EP2017/071769
§ 371 (c)(1),
(2) Date: Feb. 26, 2019

(87) PCT Pub. No.: WO2018/041898
PCT Pub. Date: Mar. 8, 2018

(65) Prior Publication Data
US 2021/0279478 A1    Sep. 9, 2021

(30) Foreign Application Priority Data
Aug. 31, 2016  (EP) ................................. 16186492

(51) Int. Cl.
*G06K 9/00*    (2006.01)
*G06K 9/46*    (2006.01)

(52) U.S. Cl.
CPC ....... *G06K 9/00791* (2013.01); *G06K 9/4604* (2013.01); *G06K 9/4647* (2013.01); *G06K 9/4652* (2013.01)

(58) Field of Classification Search
CPC ............. G06K 9/00791; G06K 9/4652; G06K 9/4647; G06K 9/4604
(Continued)

(56) References Cited

U.S. PATENT DOCUMENTS 8,750,567 B2    6/2014   Zhang et al.
9,443,163 B2 *  9/2016   Springer ............ G06K 9/00805
(Continued)

OTHER PUBLICATIONS

Chia-Hsiung, Chen et al.; "Edge Detection on the Bayer Pattern", Circuits and Systems, 2006, APCCAS 2006; IEEE Asia Pacific Conference on, IEEE, Piscataway, NJ, Dec. 1, 2006, pp. 1132-1135, XP031071039, ISBN: 978-1-4244-0387-5.
(Continued)

*Primary Examiner* — Ali Bayat
(74) *Attorney, Agent, or Firm* — Dickinson Wright PLLC

(57) ABSTRACT

A vision system (10) for a motor vehicle having an imaging apparatus (11) to capture images from a surrounding of the motor vehicle and a data processing device (14) performing image processing on images captured by the imaging apparatus (11) and to control at least one driver assistance device (18) depending on a result of the image processing. The image processing having object detection through edge detection and the object detection having decomposing (21, 22) images captured by the imaging apparatus into a plurality of decomposed images (23, 24) having different color characteristics. Separate edge detection (35, 36) is performed on the decomposed images. The edges (37, 38) from the separate edge detections are merged (39) into a common list of edges. An edge distinguishability measure is calculated for each of the edges (37, 38), and the merging of the edges (37, 38) is based on the edge distinguishability measure.

15 Claims, 2 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 10,325,166 | B2* | 6/2019 | Kwant | G06K 9/4642 |
| 11,003,919 | B1* | 5/2021 | Ghadiok | G06K 9/6256 |
| 2013/0266175 | A1* | 10/2013 | Zhang | G06T 7/181 |
| | | | | 382/103 |
| 2016/0350603 | A1* | 12/2016 | Suddamalla | G06K 9/4604 |
| 2016/0379064 | A1* | 12/2016 | Beek | G06K 9/4652 |
| | | | | 382/104 |
| 2018/0025235 | A1* | 1/2018 | Fridman | G06T 7/337 |
| | | | | 382/103 |
| 2018/0165527 | A1* | 6/2018 | Park | H04N 5/77 |
| 2018/0194286 | A1* | 7/2018 | Stein | G06K 9/00791 |

OTHER PUBLICATIONS

Gao, Li et al.; "Color edge detection based on mathematical morphology in HSI space"; Computer and Information Application (ICCIA), 2010 International Conference on, IEEE, Dec. 3, 2010, p. 508, XP032104164, DOI: 10.1109/ICCIA.2010.6141522 (ISBN: 978-1-4244-8597-0.

Gumpp, T. et al.; "Recognition and tracking of temporary lanes in motorway constructions sites"; Intelligent Vehicles Symposium, 2009 IEEE, IEEE, Piscataway, NJ, USA, Jun. 3, 2009, pp. 305-310, XP031489858, ISBN: 978-4244-3503-6.

International Search Report and Written Opinion of PCT/EP2017/071769, dated Nov. 2, 2017, 4 pgs.

* cited by examiner

VISION SYSTEM AND METHOD FOR A MOTOR VEHICLE

CROSS-REFERENCE TO RELATED APPLICATION

This application is a 35 U.S.C. § 371 national phase of PCT International Application No. PCT/EP2017/071769, filed Aug. 30, 2017, which claims the benefit of priority under 35 U.S.C. § 119 to European Patent Application No. 16186492.1, filed Aug. 31, 2016, the contents of which are incorporated herein by reference in their entirety.

FIELD OF THE INVENTION

The invention relates to a vision system for a motor vehicle, including an imaging apparatus adapted to capture images from a surrounding of the motor vehicle and a processing device adapted to perform image processing on images captured by the imaging apparatus and to control at least one driver assistance device depending on a result of the image processing, wherein the image processing includes object detection through edge detection, the object detection including decomposing images captured by the imaging apparatus into a plurality of decomposed images having different color characteristics, performing separate edge detection on the decomposed images, and merging the edges from the separate edge detections into a common list of edges. The invention also relates to a corresponding vision method.

BACKGROUND

Yellow lane markings, for example, are difficult to detect in greyscale images if the lines are old or faded for other reasons, and/or on a road having a light color surface such as concrete or light-colored asphalt. Also weather conditions may cause yellow road markings to be difficult to detect. For example, such lines may be easy to detect under clouded conditions, but difficult to detect under sunny conditions. Other examples of conditions which are often difficult are sunrise and sunset.

U.S. Pat. No. 8,750,567 B2 discloses a vision system for a motor vehicle adapted to detect yellow road markings.

The objective underlying the present invention is to provide a vision system and method enabling a more reliable detection of colored structures, like road markings, outside the motor vehicle even under difficult conditions.

SUMMARY

Embodiments of the present invention addresses the above-referenced objective with the features of the independent claims described herein. According to embodiments of the invention, an edge distinguishability measure is calculated for each of the detected edges, and the merging of the detected edges is based on the distinguishability measure.

Embodiments of the invention provides a way of detecting colored road markings, and other colored objects like other vehicles, traffic signs etc., more reliably by performing edge detection in multiple images and combining the result in a new way. The decomposed images are preferably created by linearly combining color channels in a way which makes road markings of certain colors clearly visible. Edge detection is then performed in all decomposed images and the edges are combined, preferably by removing duplicate edges, i.e. edges close to each other in world coordinates, by preferably choosing the edge with the highest edge distinguishability measure, in particular the highest edge gradient, preferably normalized by a specific edge threshold. The edge threshold may preferably be calculated using a histogram of the calculated gradient image.

Embodiments of the invention performs merging on an edge level using edge distinguishability measures like relative gradient amplitudes, while U.S. Pat. No. 8,750,567 B2 merges after grouping of edges, and does not use edge distinguishability measures like the invention. According to the invention, the edges are individually detected and processed.

From all image rows of an image captured by the imaging apparatus, preferably only a selected subset of rows is searched for edges. Preferably there is a number of rows between each searched row. Further preferably, the distance between the outer searched rows corresponds to a relatively small height, in particular less than 50 cm in a distance of 80 m in front of the car, like 30 cm in a distance of 80 m in front of the car. The searching for lane markings, for example, is preferably performed in less than the bottom half of the captured image, and more preferably within a region of up to 80 m in front of the car. The above features contribute to an excellent computation efficiency of the inventive edge detection.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
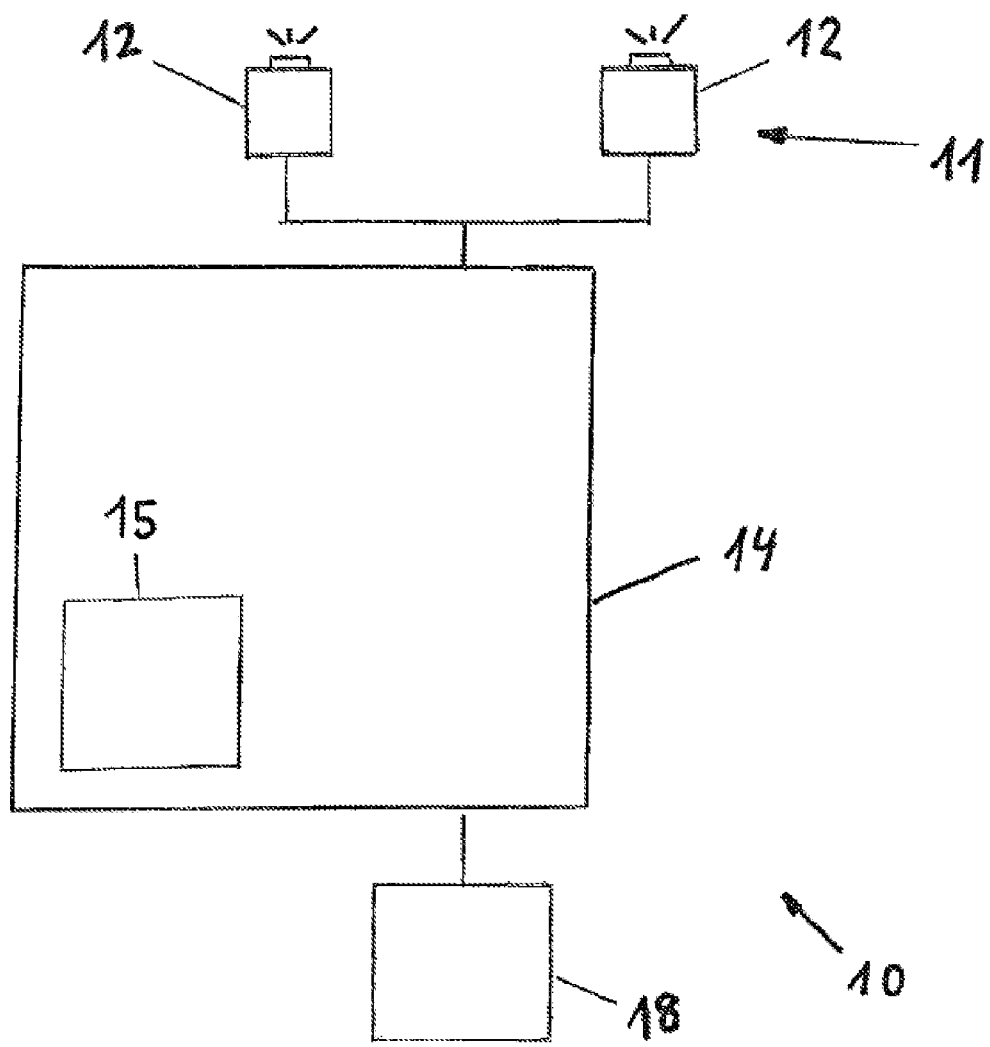
FIG. 1 shows a schematic diagram of a vision system in accordance with an embodiment of the present invention.

The vision system 10 is mounted in a motor vehicle and having an imaging apparatus 11 for capturing images of a region surrounding the motor vehicle, for example a region in front of the motor vehicle. Preferably the imaging apparatus 11 includes one or more optical imaging devices 12, in particular cameras, preferably operating in the visible and/or infrared wavelength range, where infrared covers near IR with wavelengths below 5 microns and/or far IR with wavelengths beyond 5 microns. In some embodiments the imaging apparatus 11 includes a plurality imaging devices 12 in particular forming a stereo imaging apparatus 11. In other embodiments, only one imaging device 12 forming a mono imaging apparatus 11 can be used.

The imaging apparatus 11 is coupled to a data processing device 14 adapted to process the image data received from the imaging apparatus 11. The data processing device 14 is preferably a digital device which is programmed or programmable and preferably having a microprocessor, microcontroller a digital signal processor (DSP), and/or a microprocessor part in a System-On-Chip (SoC) device, and preferably has access to, or embodies, a data memory 15. The data processing device 14 may be provided in the form of a dedicated hardware device, like a Field Programmable Gate Array (FPGA) or an Application Specific Integrated Circuit (ASIC), or an FPGA and/or ASIC part in a System-On-Chip (SoC) device, for performing certain functions, for example controlling the capture of images by the imaging apparatus 11, receiving the electrical signal containing the image information from the imaging apparatus 11, rectifying or warping pairs of left/right images into alignment and/or creating disparity or depth images. The data processing device 14, or part of its functions, can be realized by a System-On-Chip (SoC) device including, for example, FPGA, DSP, ARM and/or microprocessor functionality. The data processing device 14 and the memory device 15 are preferably realised in an on-board electronic control unit (ECU) and may be connected to the imaging apparatus 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image processing to possible activation or control of driver assistance device 18 are performed automatically and continuously during driving in real time.

Image and data processing carried out in the data processing device 14 advantageously includes identifying and preferably also classifying possible objects (object candidates) in front of the motor vehicle, such as pedestrians, other vehicles, bicyclists and/or large animals, tracking over time the position of objects or object candidates identified in the captured images, and activating or controlling at least one driver assistance device 18 depending on an estimation performed with respect to a tracked object, for example on an estimated collision probability. The driver assistance device 18 may in particular include a display device to display information relating to a detected object. However, the invention is not limited to a display device. The driver assistance device 18 may in addition or alternatively include a warning device adapted to provide a collision warning to the driver by suitable optical, acoustical and/or haptic warning signals; one or more restraint systems such as occupant airbags or safety belt tensioners, pedestrian airbags, hood lifters and the like; and/or dynamic vehicle control systems such as braking or steering control devices.

Figure 2:
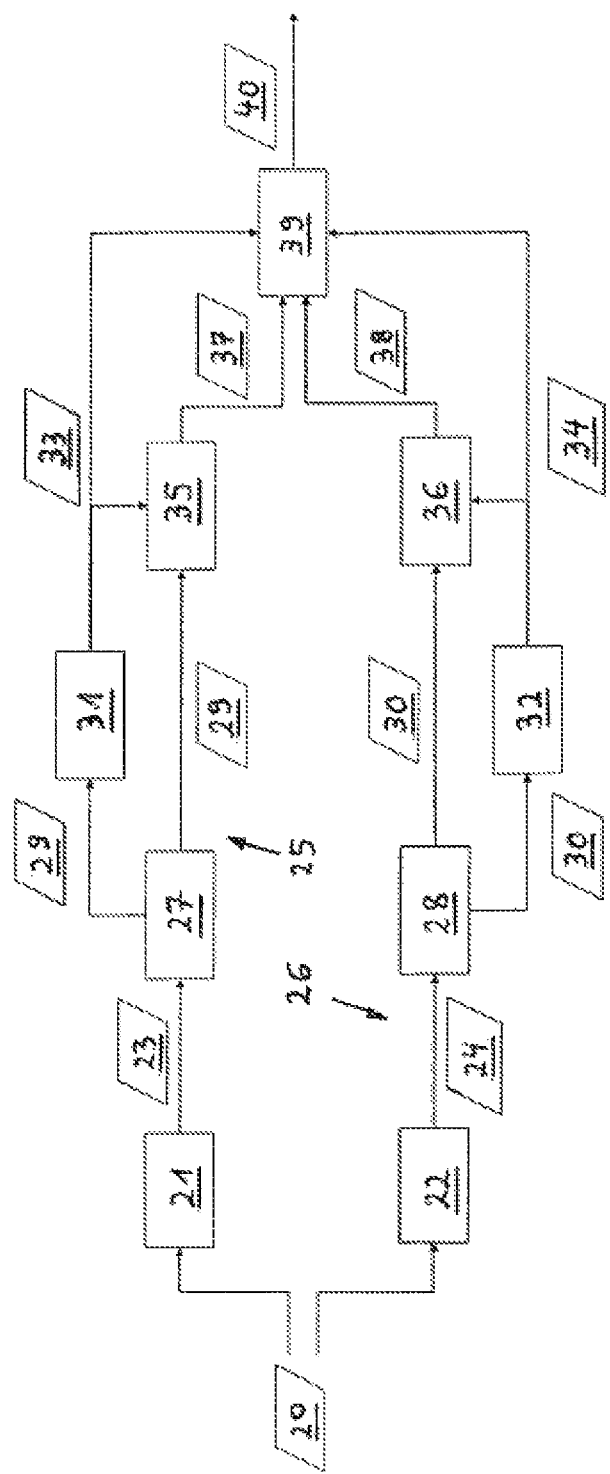
FIG. 2 shows a schematic flow diagram for illustrating the present invention.

In the following, the invention is described using the flow diagram shown in FIG. 2. Herein, color images 20 taken by the imaging apparatus 11 are processed in the data processing device 14, i.e. all steps 21 to 39 downstream of the color images 20 in FIG. 2 are performed in the data processing device 14. The color images 20 are RGGB images in the present embodiment, but could as well be color images of other color schemes.

In steps 21, 22 the raw RGGB image 20 is decomposed or demosaiced into an intensity image 23 (step 21: demosaicing intensity) and into a weighted color image 24 (step 22: demosaicing weighted color). Herein, the demosaicing intensity step 21 yields the intensity image 23 which denotes the grayscale intensity of each pixel independent of its color.

The demosaicing weighted color step 22 is designed to show as clearly as possible the color object to be detected. In the following, the color object to be detected shall be a yellow road marking, where it is clear that the invention can be applied to any other color than yellow, and to any other object that a road marking.

The weighted color image 24 is preferably of the same color as the color object in the environment of the motor vehicle to be detected. In the present example, therefore, the weighted color image 24 is advantageously a yellow image. The yellow image can preferably be calculated from an RGGB image by a linear combination between $(R+G+2\times(Bmax-B))/4$ and $(R+(Bmax-B))/2$, where R is red intensity, G is green intensity, B is blue intensity, and Bmax is maximum blue intensity in the image. This is a very calculation efficient way of calculating a yellow image providing a high yellow contrast level. For other colors than yellow, similar simple formulas can be set up to calculate the weighted color image 24 from linear combination of terms involving R, G and/or B values.

Following the decomposing of the color image 20 in steps 21 and 22, the intensity image 23 and the weighted color image 24 are processed separately, yielding two parallel processing branches 25, 26, namely the color-independent intensity processing branch 25 and the color processing branch 26.

In both branches, a gradient calculation 27, 28 is performed yielding a corresponding gradient image 29, 30, respectively. Methods for calculating a gradient image from an input image are known to the skilled person.

For the gradient image 29, next an intensity edge threshold 33 is calculated in a threshold calculation section 31. In the threshold calculation section 31 preferably a histogram of all gradient values in the gradient image 29 is calculated first. The edge threshold 33 for the intensity image 23 may then be calculated as a factor times the median of all gradient values. Instead of the median, any other center value regarding the statistical distribution of the gradient values could be used, for example the mean value, or the value providing the highest number in the histogram. Furthermore, the statistical center value (median, mean, etc.) may be calculated in other ways than from a gradient values histogram, for example directly from the gradient image; in that case, the calculation of a histogram may not be necessary.

Similarly, for the gradient image 30 in the color image processing branch 26, an intensity edge threshold 34 is calculated in a threshold calculation section 32. In the threshold calculation section 32 preferably a histogram of all gradient values in the gradient image 30 is calculated first. The edge threshold 34 for the color image 24 may then be calculated as a factor times the median of all gradient values, or any other center value regarding the statistical distribution of the gradient values. Also here, the statistical center value may be calculated in other ways than from a gradient values histogram.

Next, in the edge detection sections 35, 36, the gradient images 29, 30 are thresholded with or against the corresponding calculated edge threshold 33, 34, respectively. Thresholding here means that every pixel of the gradient image 29, 30 falling below the corresponding edge threshold 33, 34 is set to zero, and every pixel of the gradient image 29, 30 reaching (in other embodiments, reaching or exceeding) the corresponding edge threshold 33, 34 is set to some non-zero value. As result, all non-zero positions of the thresholded intensity gradient image 29 are stored as intensity edges 37, and all non-zero positions of the thresholded color gradient image 30 are stored as color edges 38.

In the next step, a normalized gradient value is calculated for each stored edge 37, 38 by dividing the gradient value of the edge under consideration by the corresponding threshold value 33, 34. This normalized gradient value is a measure of how clearly the edge 37, 38 can be seen in the image. The normalized gradient value calculation can be performed in the merging section 39 to be described in the following.

After the normalized gradient value calculation, the lists of edges 37, 38 with normalized gradient values can be merged into a common list of edges in the merging section 39.

Finally, duplicate edges are removed from the common list of edges 37, 38. Duplicate edges are multiple edges which are caused by the same physical structure outside the vehicle, for example, lane marking. In the present context, two edges are considered duplicate if their positions are within a specified limit in world coordinates. For all duplicate edges, the edge having the lower or lowest normalized gradient is removed. Generally, for all duplicate edges, only the edge having the highest normalized gradient is kept. The output of the merging section 39 is a list 40 of detected edges free of duplicates. It is clear from the above that the edges contained in the final edge list 40 is a true subset of all edges 37, 38 due to the merging and duplicate removing process.

Further object detection processing, like road marking detection in the present example, can be performed on the list 40 of detected edges.

The invention can be readily generalized to more than two processing branches 25, 26 by decomposing each color images 20 into more than two decomposed images 21, 22, in particular one decomposed intensity image 21 and two or more decomposed color images 22 involving different color characteristics.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle, comprising an imaging apparatus adapted to capture images from a surrounding of the motor vehicle and a data processing device adapted to perform image processing on images captured by the imaging apparatus and to control at least one driver assistance device depending on a result of the image processing, wherein the image processing comprises object detection through edge detection, the object detection comprising decomposing images captured by the imaging apparatus into a plurality of decomposed images having different color characteristics, performing separate edge detection on the decomposed images, and merging detected edges from the separate edge detections into a common list of edges, an edge distinguishability measure is calculated for each of the edges, and the merging of the edges is based on the edge distinguishability measure.

2. The vision system as claimed in claim 1 further comprising the merging of the edges is based on selecting the edge among the edges from different decomposed images providing a highest distinguishability measure.

3. The vision system as claimed in claim 1 further comprising in that a gradient image is calculated on each of the decomposed images.

4. The vision system as claimed in claim 3 further comprising in that the edge distinguishability measure is a gradient amplitude of each of the detected edges.

5. The vision system as claimed in claim 3 further comprising a normalized gradient is calculated for each of the detected edges.

6. The vision system as claimed in claim 5 further comprising the normalized gradient is calculated by dividing the gradient value of the detected edges by a corresponding edge threshold value.

7. The vision system as claimed in claim 1 further comprising an edge threshold is calculated for each of the decomposed images.

8. The vision system as claimed in claim 7 further comprising, the edge threshold is calculated from a statistical center value of gradient values, including a median of gradient values of other values.

9. The vision system as claimed in claim 7 further comprising the edge detection is performed by thresholding a gradient image against the edge threshold.

10. The vision system as claimed in claim 1 further comprising duplicates of the detected edges are removed from all of the edges detected in each of the decomposed images.

11. The vision system as claimed in claim 1 further comprising two of the detected edges are considered duplicates if their positions are within a specified limit in world coordinates.

12. The vision system as claimed in claim 1 further comprising the decomposed images comprise an illumination intensity image and a weighted color image.

13. The vision system as claimed in claim 12 further comprising the weighted color image has the same color as the object in the environment of the motor vehicle to be detected.

14. The vision system as claimed in claim 12 further comprising the weighted color image is a yellow image calculated from an RGB image by a linear combination between $(R+G+2\times(B_{max}-B))/4$ and $(R+(B_{max}-B))/2$.

15. A vision method for a motor vehicle, comprising capturing images from a surrounding of the motor vehicle, performing image processing on captured images and controlling at least one driver assistance device depending on a result of the image processing, wherein the image processing comprises object detection through edge detection, the object detection comprising decomposing captured images into a plurality of decomposed images having different color characteristics, performing separate edge detection on the decomposed images, and merging the edges from the separate edge detections into a common list of edges, an edge distinguishability measure is calculated for each of the edges, and the merging of the edges is based on the edge distinguishability measure.

* * * * *